(No Model.) 2 Sheets—Sheet 2.
E. SMITH.
SPEED CONTROLLING APPARATUS FOR LATHES.
No. 585,712. Patented July 6, 1897.
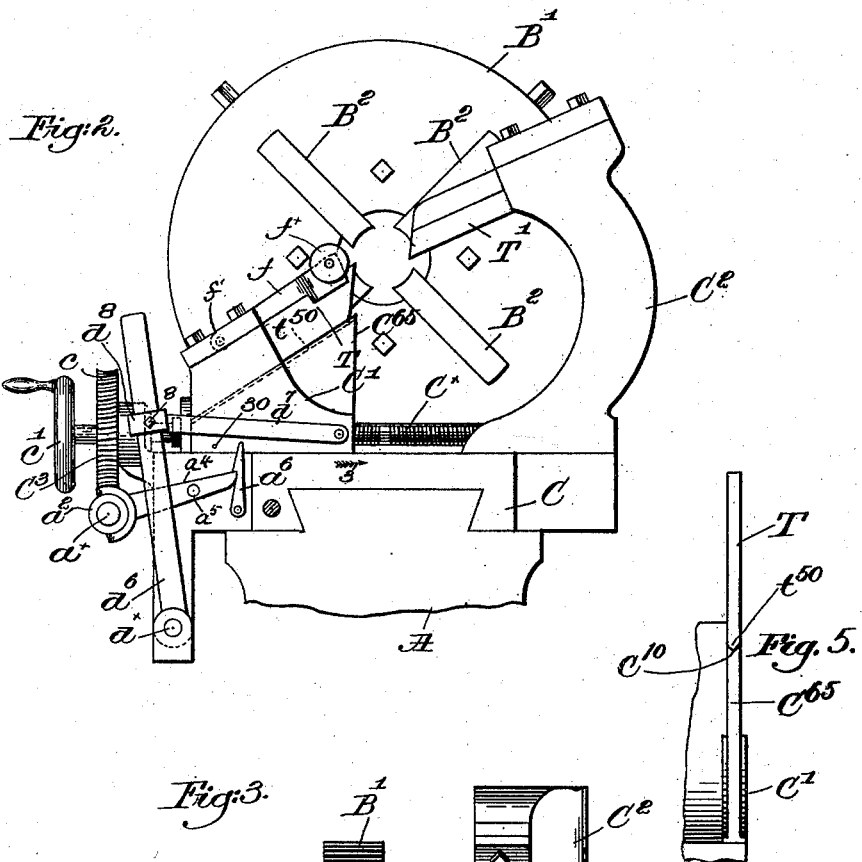
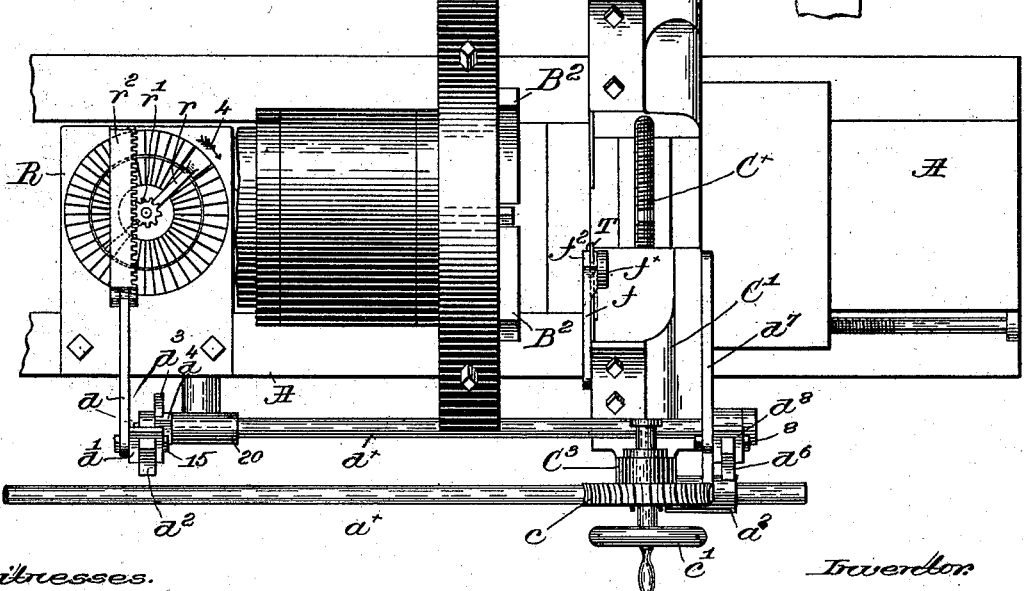

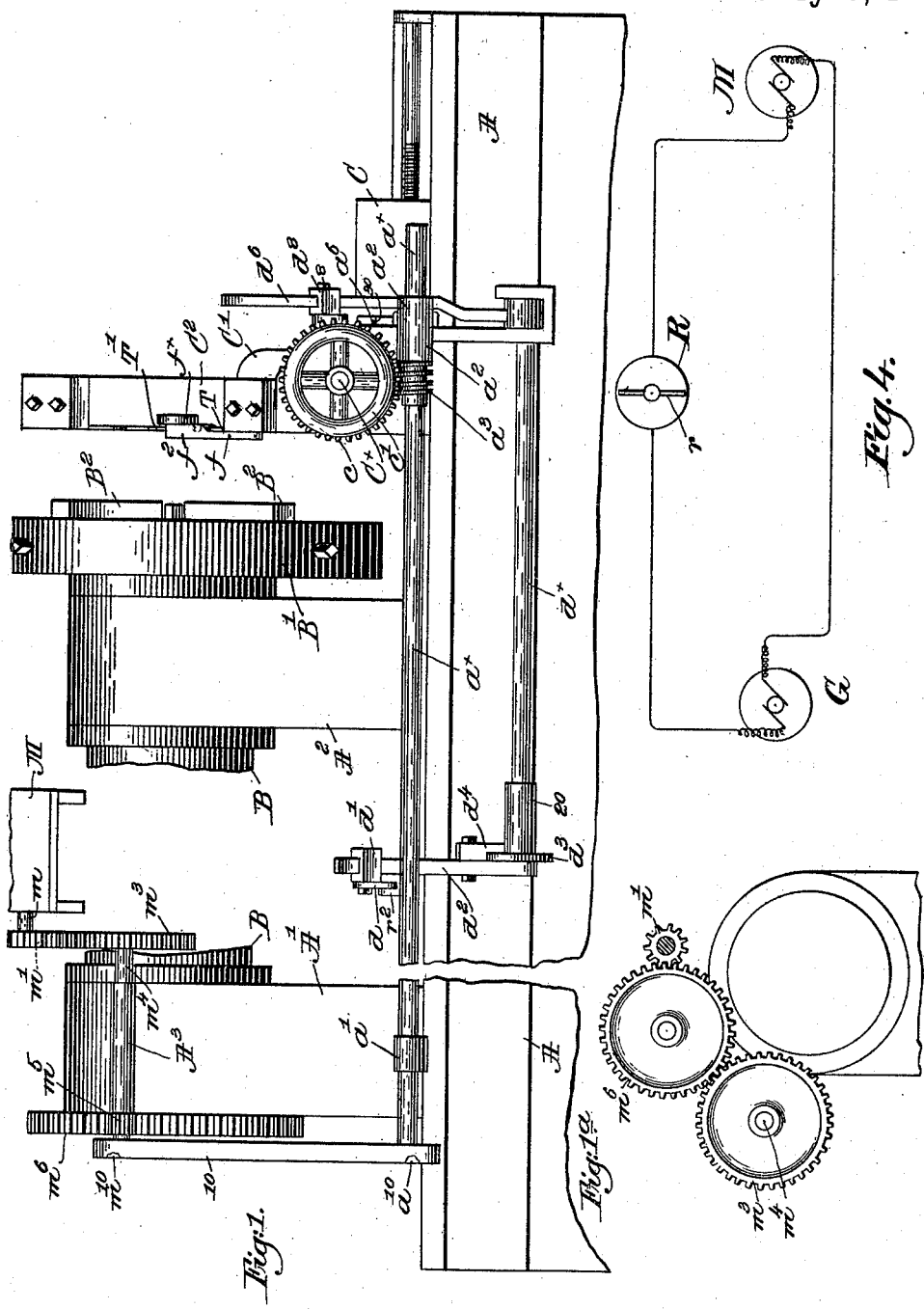

UNITED STATES PATENT OFFICE.

EPHRAIM SMITH, OF BOSTON, MASSACHUSETTS.

SPEED-CONTROLLING APPARATUS FOR LATHES.

SPECIFICATION forming part of Letters Patent No. 585,712, dated July 6, 1897.

Application filed July 17, 1896. Serial No. 599,474. (No model.)

*To all whom it may concern:*

Be it known that I, EPHRAIM SMITH, of Boston, county of Suffolk, and State of Massachusetts, have invented an Improvement in Speed-Controlling Apparatus for Lathes and Similar Machines, of which the following description, in connection with the accompanying drawings, is a specification, like letters and figures on the drawings representing like parts.

This invention has for its object the production of simple and effective means for controlling the rotative speed of the work-holder, commonly known as the "spindle," in lathes or cutting-off machines and similar apparatus.

As the tool is fed transversely to the longitudinal axis of the work in lathework, such as facing off and squaring up, it is necessary to run it slow enough to prevent the point of the tool from being worn off, but it is also very desirable that this uniform cutting speed should be maintained as nearly as possible as the tool works toward the center.

By my invention I am able to maintain a uniform cutting speed at the point of the tool as the diameter of the work decreases, whereby the operator is enabled to do from three to four times the amount of work in a given time that he could with a machine unprovided with my improved speed-controlling means.

I find it very desirable that the machine should be under complete control of the operator, both as to the number of revolutions the spindle of the lathe or other apparatus should make and also as to the amount the speed should increase from the periphery to the center of the work, according to the hardness, size, and nature of the work being done.

I have devised simple means, controlled by the feed of the tool, to gradually increase the speed of rotation of the work, and I have made provision for automatically stopping the feed at the desired time. Heretofore in cutting apparatus of this class it has been customary to use a comparatively thick cutting-tool having a wide face in order to give stiffness to the tool and prevent its running crooked, it resulting in a certain waste of the work and at the same time requiring more power. I have shown a movable guide or support which embraces the tool near the point and prevents lateral movement thereof, so that a very thin narrow-faced tool may be employed, with a consequent reduction in the amount of waste and power required. Until the tool enters the work the guide embraces and supports it, but as the tool enters the work deeper the guide is engaged by the work and moved away from the tool, so as not to interfere with its further operation.

Figure 1 is a side elevation, partly broken out, of a cutting-lathe, shown as driven by an electric motor, with one form of my invention applied thereto. Fig. 1$^a$ is a detail to be referred to. Fig. 2 is a right-hand end elevation of the apparatus shown in Fig. 1. Fig. 3 is a partial top or plan view thereof, partially broken out to show more clearly the variable resistance. Fig. 4 is a diagrammatic view of the motor and its variable-resistance device or rheostat, and Fig. 5 is an inner edge view of the tool-holder to be described.

I have chosen to illustrate my invention as applied to a machine for cutting metal bars, shafting, and the like, though it will be obvious hereinafter that my invention is equally well adapted for use in connection with other forms of apparatus wherein the work is held in a rotatable holder and the tool is fed transversely thereto.

The bed-plate A, having uprights or standards A' A$^2$ to support the hollow barrel B of the face-plate B', having dogs or chucks B$^2$ thereon to secure the work in place, the carriage C, having transversely movable thereon the tool-holder C' and C$^2$, actuated by a feed-screw C$^\times$, are and may be of usual or well-known construction in machines of this class.

The front end of the feed-screw C$^\times$ is mounted in a bearing C$^3$ on the carriage and is provided with the usual worm-wheel $c$ and hand-wheel $c'$, a shaft $a^\times$, extended along the side of the bed-plate A and rotatable in bearings $a'$ $a^2$ thereon, having fast upon it a worm $a^3$ to actuate the worm-wheel $c$ when in engagement therewith.

As shown in Fig. 2, the bearing $a^2$ is mounted on an arm $a^4$, pivoted to the bed at $a^5$, and is held in operative position by a latch $a^6$, the release of the arm permitting the bearing $a^2$ to drop sufficiently to disengage the worm-wheel and worm referred to, thereby stopping the feed of the tool-holders.

I have shown in Fig. 1 an electric motor M, secured in any suitable manner adjacent the apparatus and having secured to its rotatable member $m$ a pinion $m'$, (see dotted lines, Fig. 1, and full lines, Fig. 1$^a$,) said pinion meshing with a gear $m^2$, which in turn engages a gear $m^3$, fast on a shaft $m^4$, mounted in a bearing A$^3$ on the standard A'. This shaft $m^4$ has on its outer end a pinion $m^5$ in mesh with a large gear $m^6$, fast on the barrel B of the work-holder, to thereby rotate the same through the train of gears, and a band 10 is shown in Fig. 1, connecting pulleys $m^{10}$ $a^{10}$ on shafts $m^4$ and $a^\times$, respectively, to rotate the latter.

While the connections herein described between the motor M and work-holder are the most convenient for adaptation in the present case, it is to be understood that the intermediate connections may be varied in any desired manner, as they are not of the gist of the invention.

A rheostat or variable-resistance device R of well-known form is shown as mounted for convenience on the bed-plate A between the standards A' and A$^2$ and in circuit with the generator G and motor M, as shown in diagram, Fig. 4, whereby the current to the motor may be regulated and thereby its speed.

The movable member or controller $r$ of the rheostat is shown in Fig. 3 as provided on its axis with a pinion $r'$ in engagement with a rack $r^2$, pivotally connected by a link $d$ to a block $d'$, adjustable longitudinally on an arm $d^2$ by means of a suitable set-screw 15. A rock-shaft $d^\times$ is mounted in suitable bearings 20 on the bed or frame A and has fast thereon at one end a disk $d^3$, to which, by a clamp $d^4$ on the arm $d^2$, the latter is secured in desired adjusted position, the said arm being mounted on the rock-shaft. By rotation of the latter in one or the other direction the arm $d^2$ will be rocked to actuate the movable member $r$ of the rheostat to vary the resistance of the motor-circuit, and consequently the speed of the latter and the apparatus driven thereby.

A second arm $d^6$ is secured to the rock-shaft near the carriage C, and a link $d^7$, having at one end a block $d^8$ to be adjusted by a set-screw 8 on the arm $d^6$, is pivotally connected at its other end to one of the tool-holders, as C'. (Clearly shown in Figs. 2 and 3.)

The tools T and T' are held in the holders in usual manner, and it will be understood that the work, such as a bar, shaft, &c., is firmly secured in the work-holder and the latter rotated, the tools approaching the longitudinal center of the work as they enter the latter. This transverse feed of the tools is controlled by the rotation of the feed-screw C$^\times$, the latter being actuated automatically through the worm-wheel $c$ and worm $a^3$ or by means of the hand-wheel $c'$.

When the tool begins to engage the work, the speed of rotation of the latter must be very slow in order to avoid breakage or severing of the tool, and the resistance in the motor-circuit will be greatest; but as the tool enters and nears the center of the work the speed of rotation should increase in order that the surface speed of the work at the cutting-point should be as near uniform as possible. Accordingly the resistance is gradually decreased as the depth of cut increases, and such variation in the resistance is governed by the transverse feed of the tool.

Referring to Figs. 2 and 3, it will be obvious that movement of the tool-holder C' in the direction of arrow 3 will rock the shaft $d^\times$, through the intermediate connections, to move the rack $r^2$ to rotate the movable member $r$ of the rheostat in direction of arrow 4, Fig. 3, to thereby gradually decrease the resistance and correspondingly speed up the work.

In the drawings the parts are shown in position after the apparatus has been started, but with the work omitted to avoid confusion.

It will be obvious that by varying the position of the blocks $d'$ and $d^8$ and also by setting the arm $d^2$ on the rock-shaft $d^\times$ the initial speed and the range of speed from starting to stopping of the apparatus may be regulated to conform to the size and character of the work. By this adjustment the machine may be started at any desired speed and the speed increased from such point.

In Fig. 2 a pin 30 is shown on the holder C' to engage and automatically trip the latch $a^6$ when the cutting edge of the tool has reached a certain depth, and as soon as the latch is tripped the worm-shaft $a^\times$ moves to throw the feed mechanism out of operation, and the speed of the work-holder then remains constant unless the current is at the same time cut off from the motor.

I have provided a novel and effective device for guiding the leading tool, as T, until it enters and makes a seat for itself in the work, so that the tool may be made very thin without danger of running crooked.

On the holder C', I have herein shown a strong movable arm $f$, pivoted at $f'$ on the holder and having an offset ear $f^2$ at its outer end, grooved in its under face to embrace the back of the tool T, as clearly shown in Figs. 2 and 3, near the point of the latter, the lower edge $t^{50}$, Fig. 5, of the tool being beveled to enter a V-shaped slot C$^{10}$ in the part C$^{65}$ of the tool-holder.

A roller or other stud $f^\times$ is mounted on the ear in position to be engaged by the periphery of the work, and as the tool enters deeper and deeper into the latter the arm is raised gradually from the tool by such engagement with the periphery of the work.

By the time the tool has made a groove or seat for itself, as it were, there is no further danger of breaking or deviation from its course, and the guide has to perform no further function.

It will be obvious from the foregoing that my invention may be applied to any form of apparatus wherein the work is held in a rotatable holder and presented to a tool having a feed movement transverse thereto wherein it is desirable to preserve a uniform rate of speed of the work at the point whereat the tool acts, and accordingly my invention is not restricted to the apparatus herein shown nor to the precise form of connections between the feed of the tool and the variable resistance.

If it be desired to operate the feed of the tool by hand, it will be obvious that the speed may be controlled as hereinbefore described, and by loosening the clamp $d^4$ the rheostat-controlling mechanism is disconnected from the feed.

Having fully described my invention, what I claim, and desire to secure by Letters Patent, is—

1. In an apparatus of the class described, a rotatable work-holder, an electric motor to rotate it, a variable resistance in circuit therewith, a tool-holder, means to feed it transversely to said work-holder, connections between said means and the resistance, to vary the latter proportionally to the position of the tool-holder, and means to vary the speed of the apparatus between but not beyond predetermined points, substantially as described.

2. In an apparatus of the class described, a rotatable work-holder, a tool-holder movable transversely thereto, a tool rigidly mounted in the holder, and a movable guide adapted to embrace the back of and steady the tool as it enters the work, the work engaging and moving the guide away from the tool, as the latter enters the work, substantially as described.

3. A tool-holder, a tool held rigidly therein, and a guide movably mounted on and carried by the holder to embrace and steady the tool near its point as it enters the work, engagement of the surface of the latter with the guide moving it out of engagement with the tool, substantially as described.

4. In an apparatus of the class described, a work-holder, an electric motor to rotate it, a rheostat in circuit with the motor, a tool-holder, means to feed it transversely to the longitudinal axis of the work-holder, connections between said feeding means and the rheostat, to control the latter and thereby the speed of the work-holder, and means to stop the feed and movement of the rheostat at a predetermined point, substantially as described.

5. A tool-holder having a grooved seat, a tool rigidly held in the holder and having a beveled lower edge to rest in the seat, and a guide movably mounted on the holder to engage and steady the tool near its point, substantially as described.

In testimony whereof I have signed my name to this specification in the presence of two subscribing witnesses.

EPHRAIM SMITH.

Witnesses:
  JAS. F. MITCHELL,
  JOHN C. EDWARDS.